(12) United States Patent
Nakaoka

(10) Patent No.: US 8,780,228 B2
(45) Date of Patent: Jul. 15, 2014

(54) IMAGE CAPTURE APPARATUS AND CONTROL METHOD THEREOF

(75) Inventor: Hiroshi Nakaoka, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 535 days.

(21) Appl. No.: 13/089,581

(22) Filed: Apr. 19, 2011

(65) Prior Publication Data

US 2011/0279708 A1 Nov. 17, 2011

(30) Foreign Application Priority Data

May 12, 2010 (JP) .................................. 2010-110592

(51) Int. Cl.
  *H04N 5/76* (2006.01)
(52) U.S. Cl.
  USPC .................. 348/231.6; 348/241; 348/340
(58) Field of Classification Search
  USPC ............... 348/23.6, 241, 340, 207.99–376; 396/71
  See application file for complete search history.

(56) References Cited

U.S. PATENT DOCUMENTS

| 7,245,319 | B1 | 7/2007 | Enomoto | |
|---|---|---|---|---|
| 2006/0140503 | A1* | 6/2006 | Kurata et al. | 382/275 |
| 2008/0239107 | A1 | 10/2008 | Cho | |
| 2009/0009633 | A1* | 1/2009 | Suto | 348/241 |

FOREIGN PATENT DOCUMENTS

| CN | 101309367 A | 11/2008 |
|---|---|---|
| CN | 101472059 A | 7/2009 |
| JP | 10-322593 A | 12/1998 |
| JP | 2000-069343 | 3/2000 |
| JP | 2006148213 A * | 6/2006 |

OTHER PUBLICATIONS

The above references were cited in a Apr. 7, 2013 Chinese Office Action, which is enclosed with an English Translation, that issued in Chinese Patent Application No. 201110125976.8.
The above references were cited in a Nov. 16, 2012 European Search Report which is enclosed of the counterpart European Patent Application No. 11165300.2.

* cited by examiner

*Primary Examiner* — Roberto Velez
*Assistant Examiner* — Yih-Sien Kao
(74) *Attorney, Agent, or Firm* — Cowan, Liebowitz & Latman, P.C.

(57) ABSTRACT

An image capture apparatus includes an image sensor of a line-sequential scanning type, an optical database which stores optical characteristics of the optical system in advance, a calculation unit which calculates optical parameters including at least information of a focal length of the optical system for each area of the image sensor based on drive information of the image sensor and drive information of the optical system, a referring unit which refers to optical characteristics corresponding to the optical parameters calculated by the calculation unit of the optical characteristics stored in the optical database, a correction value generation unit which generates correction values used to correct the image signal based on the optical characteristics referred to by the referring unit, and a correction unit which corrects the image signal using the correction values generated by the correction value generation unit.

1 Claim, 12 Drawing Sheets

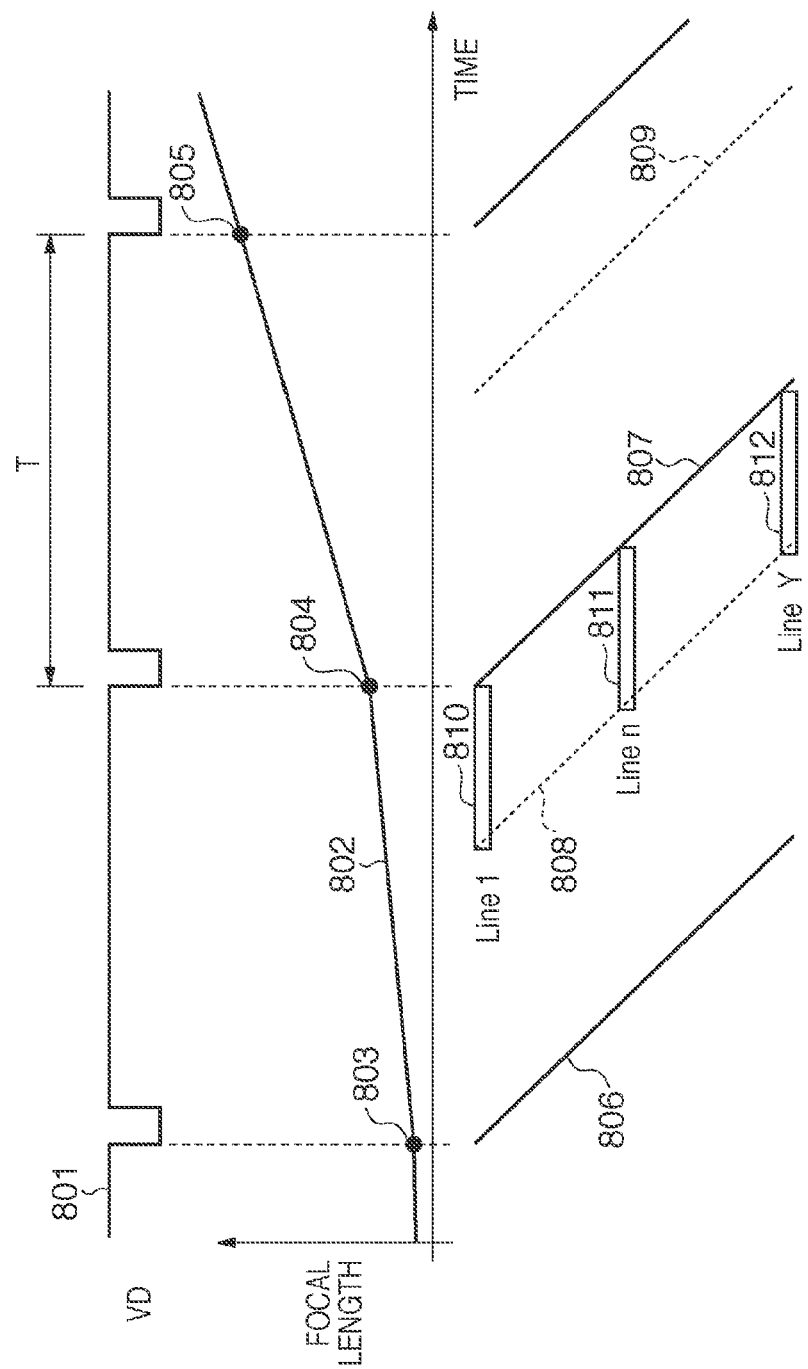

IMAGE CAPTURE APPARATUS AND CONTROL METHOD THEREOF

BACKGROUND OF THE INVENTION

1. Field of the Invention

The present invention relates to an image capture apparatus such as a video camera.

2. Description of the Related Art

Conventionally, an image capture apparatus includes a lens used to optically form an object image. Such lenses normally suffer, for example, various aberrations and marginal illumination drops, which results in distortions and density gradients in output images, thus causing image quality deterioration.

These aberrations and marginal illumination drops change depending on, for example, focal lengths, object distances, and aperture values (which will be referred to as optical parameters hereinafter). For this reason, in some conventional image capture apparatuses, the optical characteristics of a lens are stored in advance in a memory, and optical characteristics corresponding to optical parameters are acquired from the memory to correct a captured image (Japanese Patent Laid-Open No. 2000-069343).

However, Japanese Patent Laid-Open No. 2000-069343 does not particularly disclose an image sensor drive method. That is, when an image is captured using an image sensor, of a line-sequential scanning type, represented by, for example, a CMOS sensor, accumulation start and end time differences for respective lines of an image sensor caused by that scanning type are not taken into consideration.

FIG. 12 illustrates an accumulation state of a CMOS sensor and a variation state of a focal length as an optical parameter. A vertical sync signal 801 is decided based on an image capture method of an image capture apparatus, and is periodically generated at 59.94 Hz in case of, for example, National Television System Committee (NTSC) standard. A chart 802 depicts driving of a zoom lens. By plotting the time on the abscissa and the focal length on the ordinate, the chart 802 represents a focal length variation state caused upon driving of the zoom lens.

Target focal lengths 803, 804, and 805 of the zoom lens are decided for respective frames. In this case, assume that the target focal length is decided once per vertical sync period, and the zoom lens is driven to the target focal length during one vertical sync period. Charts 806 and 807 represent read drive operations of an image sensor of a line-sequential scanning type represented by a CMOS sensor. Also, charts 808 and 809 represent drive operations required to reset charges accumulated on the image sensor.

Lines 810, 811, and 812 represent some periods of a charge accumulation state on the image sensor, and each period starts when charges are reset by the reset drive operation 808 and ends when charges are read out by the read drive operation 807. Focusing attention on lines of the image sensor at that time, the first line 810 and Y-th line 812 have different times when charges are accumulated, that is, different accumulation start and end times, as can be seen from FIG. 12. However, Japanese Patent Laid-Open No. 2000-069343 does not consider such differences, and corrects the first to Y-th lines by acquiring optical characteristics based on the focal length 804 as the optical parameter at periods of the vertical sync signal. For this reason, a problem of deterioration of correction precision is posed depending on lines of the image sensor. This problem is not limited to a case in which the zoom lens is driven, but the same problem is posed when a focus lens is driven.

SUMMARY OF THE INVENTION

The present invention has been made in consideration of the aforementioned problems, and provides a technique for obtaining an image in which various aberrations of a lens are satisfactorily corrected even when an image sensor of a line-sequential scanning type is used.

According to the first aspect of the present invention, there is provided an image capture apparatus comprising: an optical system having at least a lens; an image sensor of a line-sequential scanning type, which converts an object image formed by the optical system into an image signal, and sequentially outputs the image signal line by line; an optical database configured to store optical characteristics of the optical system in advance; a calculation unit configured to calculate optical parameters including at least information of a focal length of the optical system for each area of the image sensor based on drive information of the image sensor and drive information of the optical system; a referring unit configured to refer to optical characteristics corresponding to the optical parameters calculated by the calculation unit of the optical characteristics stored in the optical database; a correction value generation unit configured to generate correction values used to correct the image signal based on the optical characteristics referred to by the referring unit; and a correction unit configured to correct the image signal using the correction values generated by the correction value generation unit, wherein each area of the image sensor is configured by pixels of at least one line that configures the image sensor.

According to the second aspect of the present invention, there is provided a control method of an image capture apparatus, which has an optical system having at least a lens and an image sensor of a line-sequential scanning type, which converts an object image formed by the optical system into an image signal, and sequentially outputs the image signal line by line, the method comprising: a step of controlling a calculation unit to calculate optical parameters including at least information of a focal length of the optical system for each area of the image sensor based on drive information of the image sensor and drive information of the optical system; a step of controlling a referring unit to refer to optical characteristics corresponding to the optical parameters calculated by the calculation unit of the optical characteristics stored in an optical database; a step of controlling a correction value generation unit to generate correction values used to correct the image signal based on the optical characteristics referred to by the referring unit; and a step of controlling a correction unit to correct the image signal using the correction values generated by the correction value generation unit, wherein each area of the image sensor is configured by pixels of at least one line that configures the image sensor.

Further features of the present invention will become apparent from the following description of exemplary embodiments with reference to the attached drawings.

BRIEF DESCRIPTION OF THE DRAWINGS

FIG. 12 is a timing chart which illustrates, along a time axis, the driving states of an image sensor and optical system in the related art.

DESCRIPTION OF THE EMBODIMENTS

Embodiments of the present invention will be described in detail hereinafter with reference to the drawings.

First Embodiment

Figure 1:
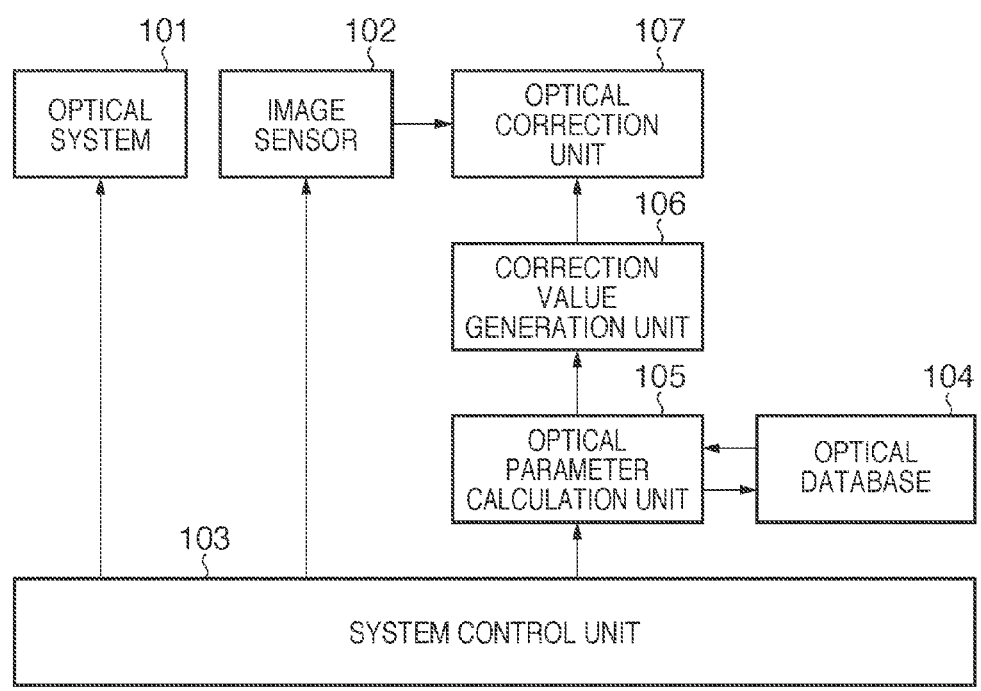
FIG. 1 is a block diagram showing the arrangement of an image capture apparatus according to the first embodiment of the present invention.

FIG. 1 is a block diagram showing the arrangement of an image capture apparatus according to the first embodiment of the present invention. Reference numeral 101 denotes an optical system which is driven by a control signal output from a system control unit 103 (to be described later), and includes a zoom lens, aperture, and focus lens. Reference numeral 102 denotes an image sensor which is driven by a control signal output from the system control unit 103 (to be described later), converts an object image formed by the optical system 101 into an electrical signal by photoelectric conversion, and outputs that signal as an image signal. This embodiment uses a CMOS image sensor as an image sensor of an XY address designation type, which reads out an image signal in one frame for respective lines to have time differences. At this time, when the image sensor 102 has an electronic shutter function, an exposure time may be adjusted to a required exposure time by a control signal output from the system control unit 103. Reference numeral 103 denotes a system control unit which controls the overall image capture apparatus. Reference numeral 104 denotes an optical database which stores and holds in advance optical characteristics for respective pixel positions of the optical system 101 according to optical parameters. An optical parameter calculation unit 105 calculates optical parameters based on drive information of the image sensor 102 and that of the optical system 101, which are output from the system control unit 103. Then, the optical parameter calculation unit 105 receives optical characteristics for respective pixel positions according to the optical parameters by referring to the optical database 104, and outputs them to a correction value generation unit 106 (to be described below). The correction value generation unit 106 generates correction values required to apply correction processing to an image signal output from the image sensor 102 based on the obtained optical characteristics. An optical correction unit 107 applies correction processing to an image signal output from the image sensor 102 based on the correction values generated by the correction value generation unit 106.

Figure 2:
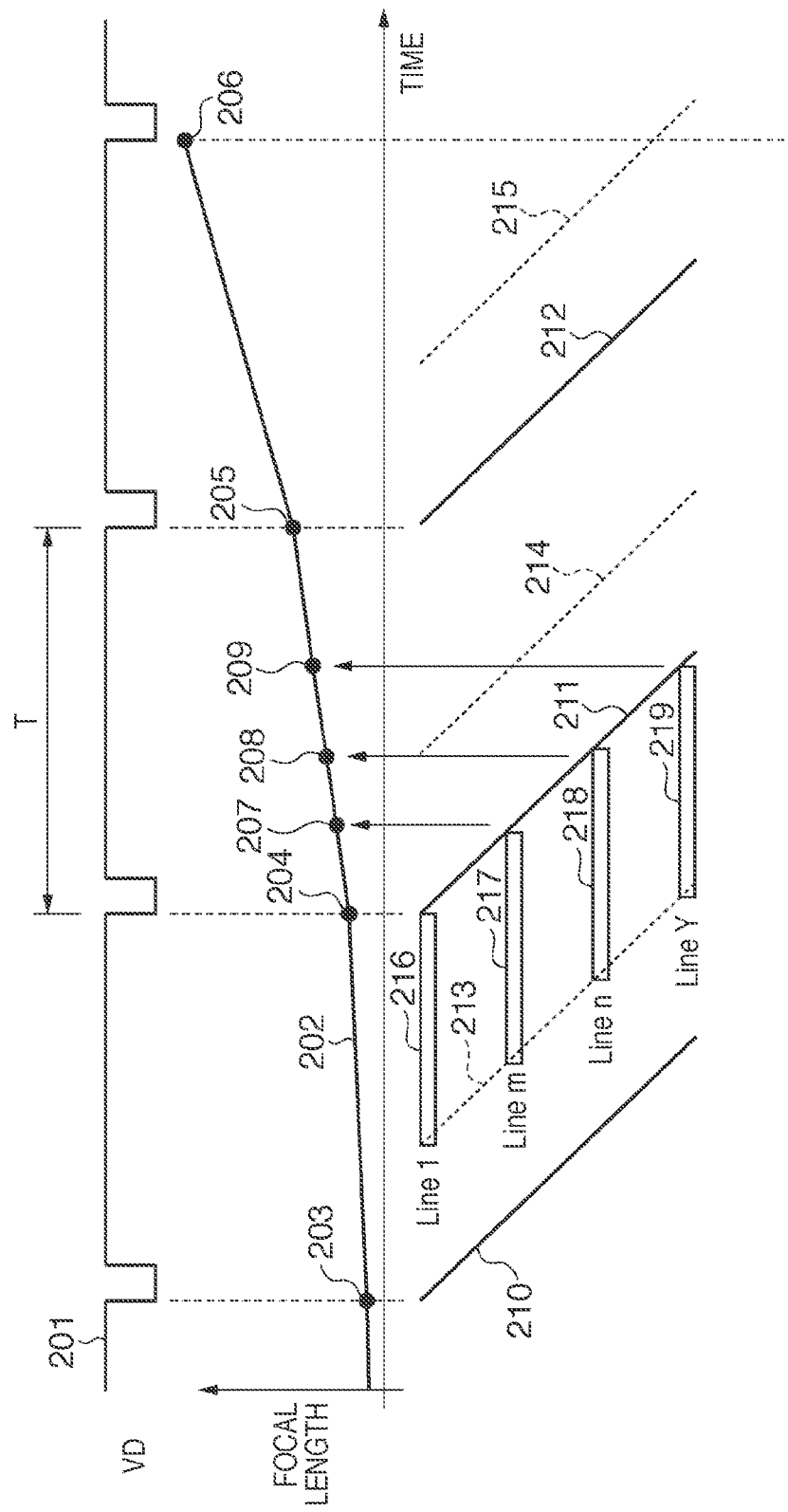
FIG. 2 is a timing chart which illustrates, along a time axis, the driving states of an image sensor and optical system according to the first embodiment.

The operation of the image capture apparatus of this embodiment will be described below with reference to FIGS. 2 and 3. FIG. 2 is a timing chart for explaining driving of the zoom lens included in the optical system 101 and that of the image sensor 102. A vertical sync signal 201 is decided based on an image capture method of the image capture apparatus, and is periodically generated. A chart 202 depicts driving of the zoom lens. By plotting the time on the abscissa and the focal length on the ordinate, the chart 202 represents a focal length variation state upon driving of the zoom lens. Target focal lengths 203, 204, 205, and 206 of the zoom lens are decided by the system control unit 103. In this case, assume that the target focal length is decided once per vertical sync period, and the zoom lens is driven to the target focal length at a constant speed by spending one vertical sync period. Focal lengths 207, 208, and 209 are some of those of the zoom lens at accumulation end times of respective lines of the image sensor 102. Charts 210, 211, and 212 represent read drive operations of the image sensor 102. Charts 213, 214, and 215 represent drive operations required to reset charges accumulated on the image sensor 102.

In this embodiment, assume that the image sensor 102 uses a CMOS image sensor which adopts a line-sequential scanning type that sequentially outputs an image signal in a line direction. In case of the image sensor of the line-sequential scanning type, since respective pixels are sequentially exposed at timings in the line direction, all or some pixels of the image sensor 102 are sequentially read out within one vertical sync period, as shown in FIG. 2. Lines 216, 217, 218, and 219 represent charge accumulation states of some lines in the image sensor 102, and a period from when charges are reset by the reset drive operation 213 until charges are read out by the read drive operation 211 corresponds to an accumulation period. In this embodiment, assume that the read and reset drive operations are controlled to control an accumulation time period and a change in read method from the image sensor 102. The following description will be continued under the assumption that one area is configured by one line.

The flowchart showing the operation of the image capture apparatus of this embodiment will be described below with reference to FIG. 3. In step S301, the system control unit 103 decides a drive method of the optical system 101 in accordance with an instruction from the user of this image capture apparatus, and sends a control signal to the optical system 101 so as to implement the desired drive method. In step S302, the system control unit 103 decides a drive method of the image sensor 102 in accordance with an instruction from the user of this image capture apparatus, and sends a control signal to the image sensor 102 so as to implement the desired drive method. In this case, letting Y be the number of lines to be read out from the image sensor 102, the system control unit 103 sends a control signal so as to read out Y lines within one vertical sync period.

In step S303, the system control unit 103 sends drive information of the image sensor 102 and that of the optical system 101 to the optical parameter calculation unit 105, and initializes lines n used to calculate a focal length in the optical parameter calculation unit 105 to "1". The system control unit 103 checks in step S304 if the lines n used to calculate a focal length are larger than the total number Y of lines to be read out from the image sensor 102. If n>Y, the process jumps to step S308; otherwise, the process advances to step S305. In this step, the system control unit 103 checks whether or not calculations of focal lengths for all the lines are complete.

In step S305, the optical parameter calculation unit 105 calculates a focal length of the n-th line based on the drive information of the image sensor 102 and that of the optical system 101, which are sent from the system control unit 103. A calculation method of the focal length of the n-th line of the image sensor 102 will be described below with reference to FIG. 4.

Figure 4:
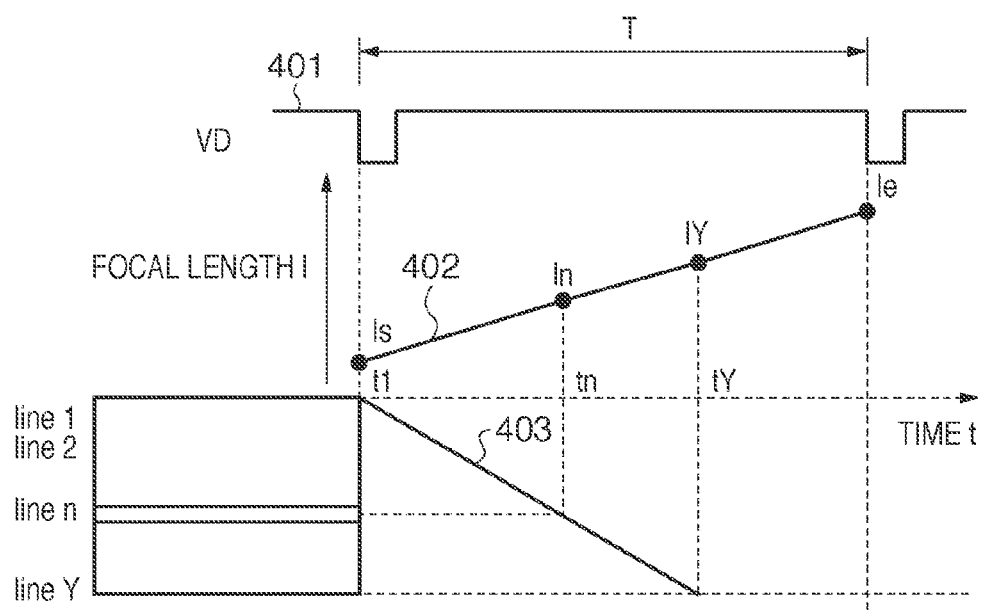
FIG. 4 is a chart showing a method of calculating a focal length from drive information of the image sensor and that of the optical system according to the first embodiment.

FIG. 4 shows an overview of an image signal read out from the image sensor 102 and a driving state of the zoom lens. A vertical sync signal 401 is decided based on the image capture method of the image capture apparatus, and is periodically generated at periods T. A chart 402 depicts driving of the zoom lens. By plotting the time on the abscissa and the focal length on the ordinate, the chart 402 represents a focal length variation state upon driving of the zoom lens. A chart 403 indicates read timings of respective lines of the image sensor 102, and first to Y-th lines are sequentially read out within a time period from a time t1 to a time tY. At this time, let ls be a focal length of the zoom lens at the time t1 at which the first line is read out, le be a target focal length after one vertical sync period since the time t1, which is decided by the system control unit 103, and tn be a read time of the n-th line. Then, a focal length ln at the read time tn of the n-th line is calculated by:

$$ln = ls + (le - ls) \cdot (tn - t1)/T \; (n=1,2,3,\ldots,Y) \qquad (1)$$

In this way, the optical parameter calculation unit 105 can calculate focal lengths of the first to Y-th lines based on the drive information of the image sensor 102 and that of the optical system 101, which are sent from the system control unit 103.

Figure 3:
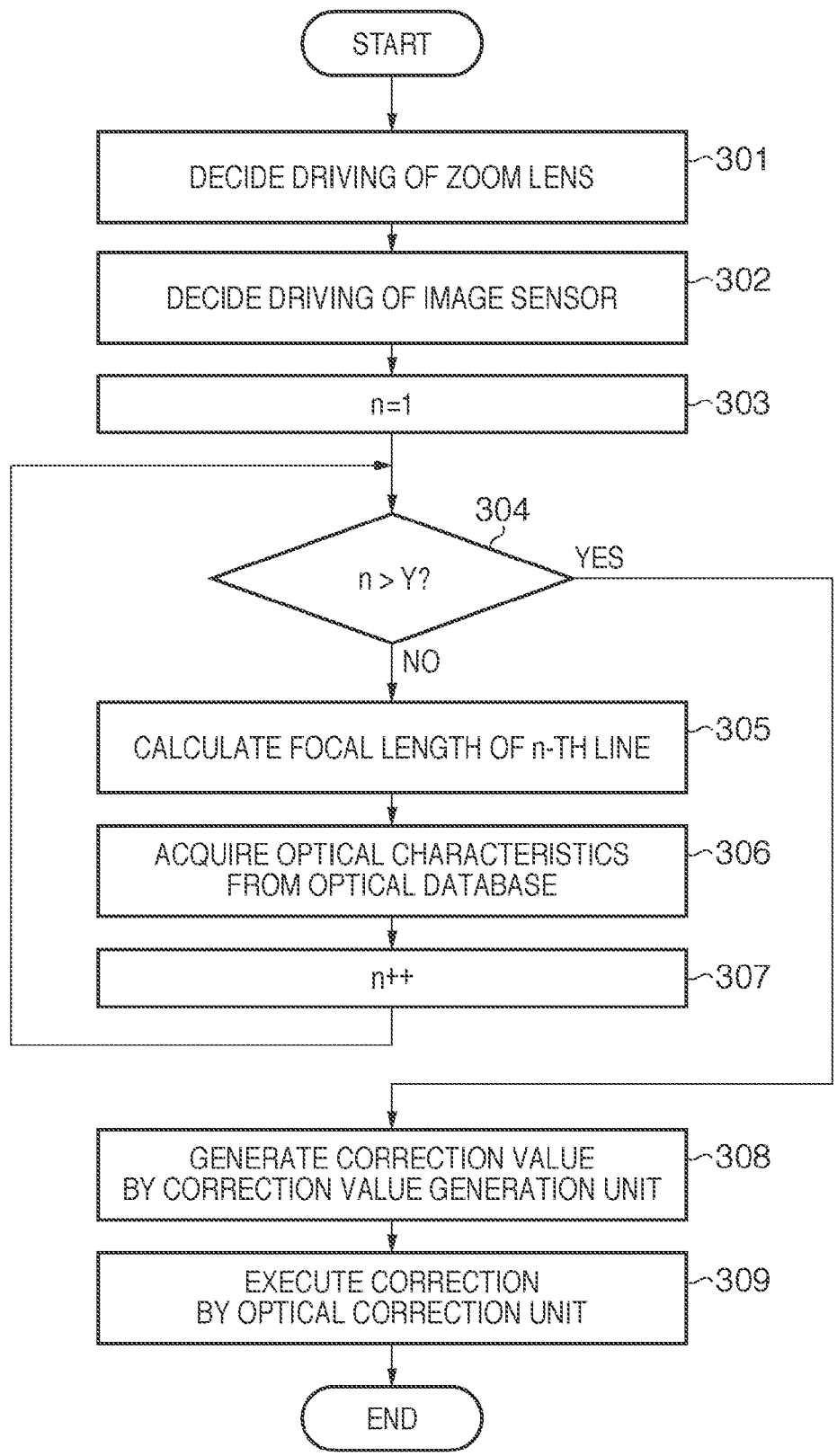
FIG. 3 is a flowchart showing an optical characteristic referring method according to the first embodiment.

The description will revert to the flowchart of FIG. 3. In step S306, the optical parameter calculation unit 105 refers to optical characteristics according to the focal length calculated using equation (1) from the optical database 104, and acquires the optical characteristics according to pixel positions included in a line of interest. In step S307, n is incremented by "1" so as to calculate a focal length of the next line.

After that, the flowchart is repeated to calculate focal lengths of all lines to be read out from the image sensor 102. If the calculations of the focal lengths of all the lines and acquisition of the optical characteristics are complete, the process advances to step S308. In step S308, the correction value generation unit 106 generates correction values using the optical characteristics acquired by the optical parameter calculation unit 105, and passes them to the optical correction unit 107. In step S309, the optical correction unit 107 applies correction processing to an image signal read out from the image sensor 102 using the correction values generated by the correction value generation unit 106.

As described above, the optical parameter calculation unit 105 calculates optical parameters of respective lines based on the drive information of the image sensor 102 and that of the optical system 101, and acquires optical characteristics according to the optical parameters of the respective lines from the optical database 104. In this manner, the optical characteristics, which appear in an image captured by the line-sequential scanning type, can be precisely expressed, and optical correction with high precision can be attained consequently.

Also, optical characteristics having image heights observed in marginal illumination drops as parameters are generally known. In this embodiment, the optical parameter calculation unit 105 may convert pixel positions of respective lines read out from the image sensor 102 into image heights. Then, the optical database 104 holds optical characteristics having image heights as parameters, and the optical parameter calculation unit 105 refers to the optical database 104 after it converts pixel positions of respective lines into image heights. Then, the data volume of the optical database 104 can also be reduced.

Second Embodiment

The second embodiment of the present invention will be described below. In the first embodiment, a focal length at a time at which outputs of each line are line-sequentially read out from the image sensor 102 is calculated, and optical characteristics according to that focal length are referred to. By contrast, in the second embodiment, a focal length at a central time of an accumulation time period of each line is calculated, and optical characteristics according to that focal length are referred to.

Figure 5:
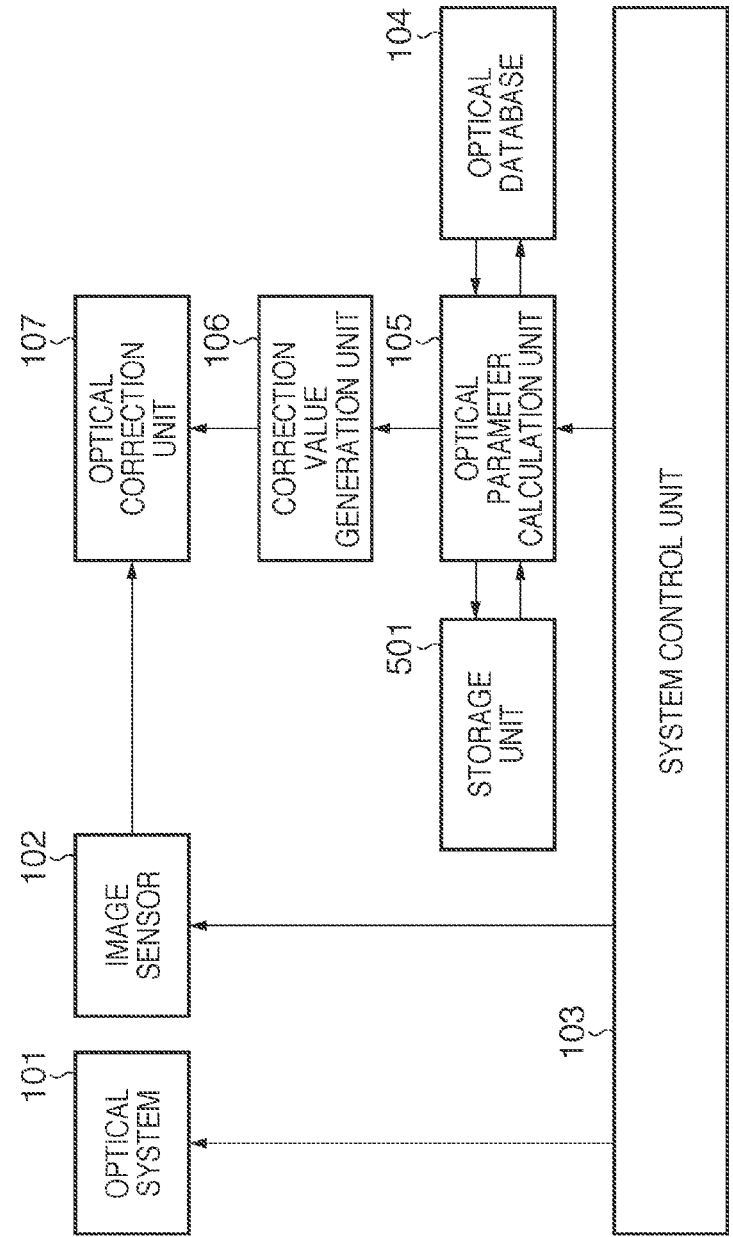
FIG. 5 is a block diagram showing the arrangement of an image capture apparatus according to the second embodiment of the present invention.

FIG. 5 is a block diagram showing the arrangement of an image capture apparatus according to the second embodiment. The same reference numerals denote components having the same functions as those of the first embodiment, and a description thereof will not be repeated. Reference numeral 501 denotes a storage unit which temporarily holds drive information of an optical system 101 to be sent from a system control unit 103 to an optical parameter calculation unit 105, and the stored drive information of the optical system 101 can be referred to by the optical parameter calculation unit 105.

Figure 6:
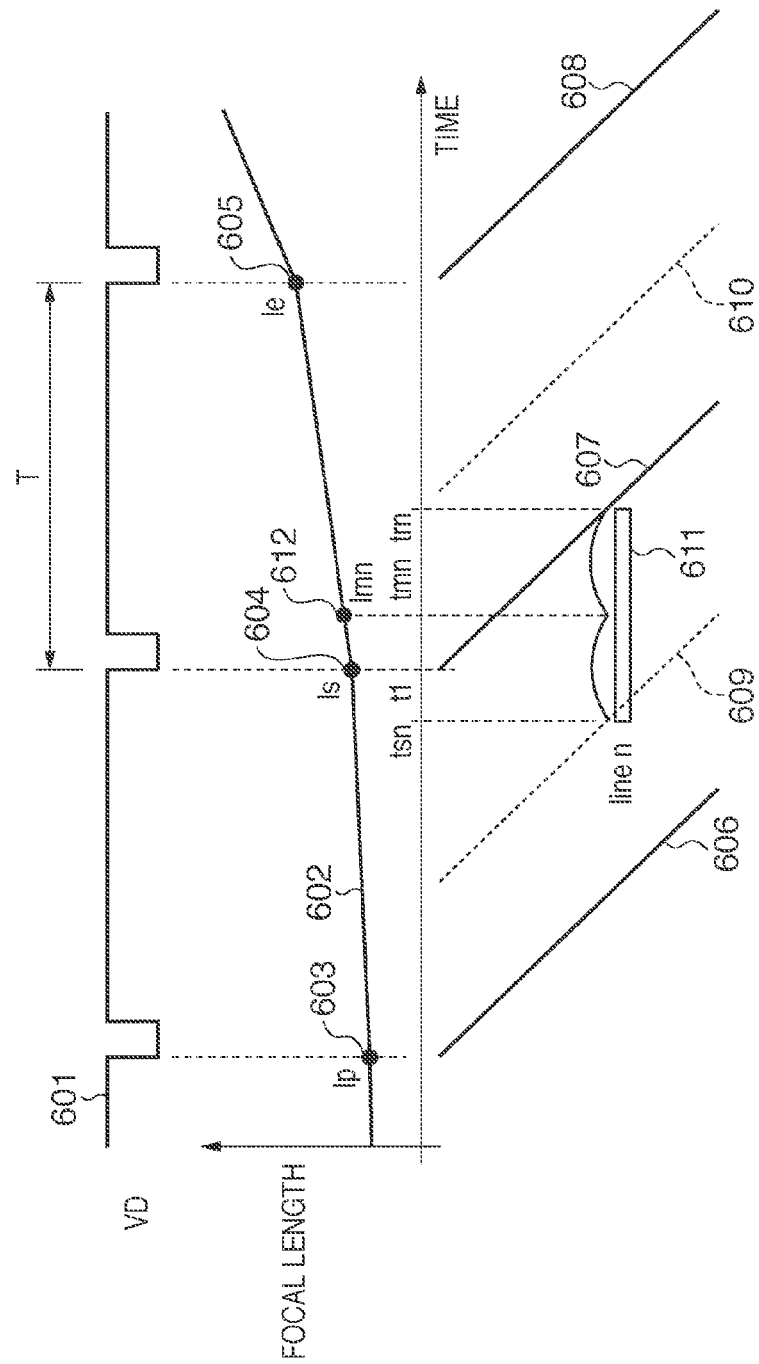
FIG. 6 is a timing chart which illustrates, along a time axis, the driving states of an image sensor and optical system according to the second embodiment.
Figure 7:
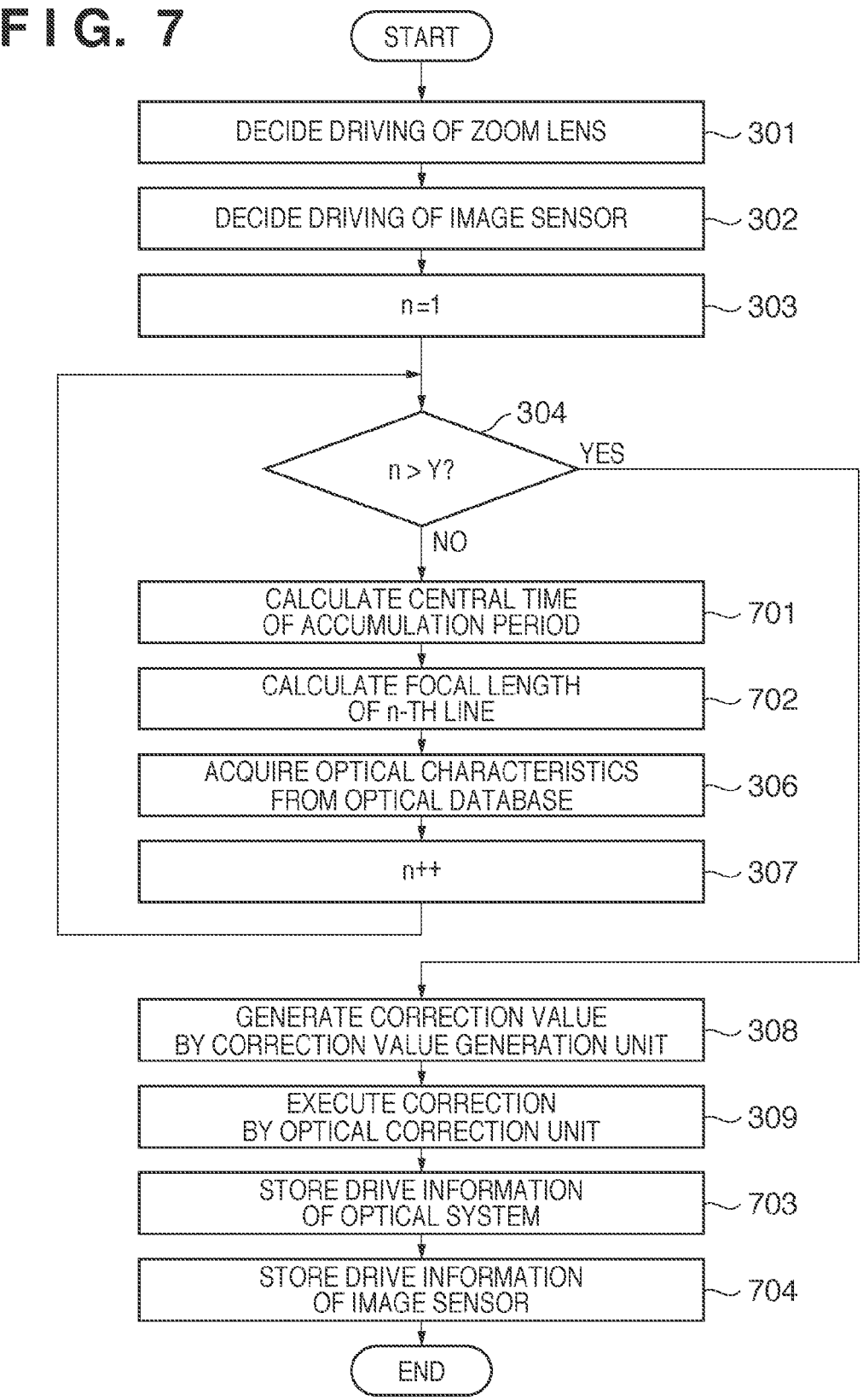
FIG. 7 is a flowchart showing an optical characteristic referring method according to the second embodiment.

The operation of the image capture apparatus of this embodiment will be described below with reference to FIGS. 6 and 7. FIG. 6 is a timing chart for explaining driving of the zoom lens included in the optical system 101 and that of an image sensor 102. A vertical sync signal 601 is decided based on an image capture method of the image capture apparatus, and is periodically generated.

A chart 602 depicts driving of the zoom lens. By plotting the time on the abscissa and the focal length on the ordinate, the chart 602 represents a focal length variation state upon driving of the zoom lens. Target focal lengths 603, 604, and 605 of the zoom lens are decided by the system control unit 103. In this case, assume that the target focal length is decided once per vertical sync period, and the zoom lens is driven to the target focal length by spending one vertical sync period.

Charts 606, 607, and 608 represent read drive operations of the image sensor 102. Charts 609 and 610 represent drive operations required to reset charges accumulated on the image sensor 102. This embodiment uses a CMOS image sensor that adopts a line-sequential scanning type as the image sensor 102.

In case of the image sensor of the line-sequential scanning type, since respective pixels are sequentially exposed at timings in the line direction, all or some pixels of the image sensor 102 are sequentially read out within one vertical sync period, as shown in FIG. 6. A line 611 represents a charge accumulation state in the image sensor 102, and a period from when charges are reset by the reset drive operation 609 until charges are read out by the read drive operation 607 corresponds to an accumulation period. In this embodiment, assume that the read and reset drive operations are controlled to control an accumulation time period and a change in read method from the image sensor 102.

As can be seen from FIG. 6, focusing attention on the operation of the optical system 101 when the image sensor 102 performs an accumulation operation, the optical system 101 is driven even during the accumulation period. In the first embodiment, the optical parameter calculation unit 105 calculates a focal length at a read time. However, in consideration of the accumulation operation, when optical characteristics are referred to based on a focal length at a central time of the accumulation period, an image signal can be corrected more precisely. Letting tsn be an accumulation start time of the n-th line and trn be a read time (accumulation end time), an accumulation center tmn is expressed by:

$$tmn=(trn+tsn)/2 \quad (2)$$

A focal length lmn at that time tmn is denoted by reference numeral 612. However, the accumulation center tmn is often set before the read time t1 of the first line depending on lines read out from the image sensor 102. In this case, the focal length lmn at the accumulation center tmn has to be calculated from the focal lengths lp 603 and ls 604 one vertical sync period before.

A calculation method of the focal length lmn at the accumulation center tmn of each line will be described below with reference to the flowchart of FIG. 7. The same step numbers denote steps that execute the same operations as in the first embodiment, and a description thereof will not be repeated.

In step S701, the optical parameter calculation unit 105 calculates the central time tmn of the accumulation period of the n-th line. As described above, the central time tmn of the accumulation period can be calculated by equation (2) using the accumulation start time tsn and accumulation end time trn of each line from drive information of the image sensor 102 obtained from the system control unit 103. At this time, the accumulation start time tsn of each line is decided by the reset operation of the image sensor 102 one vertical sync period before. Therefore, the optical parameter calculation unit 105 calculates the accumulation start time tsn of each line with reference to the drive information of the image sensor 102 stored in the storage unit 501.

In step S702, the optical parameter calculation unit 105 calculates the focal length lmn at the central time tmn of the accumulation period of the n-th line based on the drive information of the image sensor 102 and that of the optical system 101, which are sent from the system control unit 103. Now assume that the central time tmn of the accumulation period of the n-th line and a read time t1 of the first line meet:

$$tmn \geq t1 \quad (3)$$

In this case, the focal length lmn is calculated from the focal length ls at the read time t1 of the first line, and the target focal length le after one vertical sync period since the time t1, which is decided by the system control unit 103, using:

$$lmn=ls+(le-ls)\cdot(tmn-t1)/T\ (n=1,2,3,\ldots,Y) \quad (4)$$

On the other hand, assume that the central time tmn of the accumulation period of the n-th line and the read time t1 of the first line meet:

$$tmn<t1 \quad (5)$$

In this case, the focal length lmn is calculated from the focal length lp at a read time of the first line one vertical sync period before, and the target focal length decided by the system control unit 103 one vertical sync period before, that is, the focal length ls at the read time t1 of the first line in the current vertical sync period, using:

$$lmn=lp+(ls-lp)\cdot(T-t1+tmn)/T\ (n=1,2,3,\ldots,Y) \quad (6)$$

At this time, the focal length lp one vertical sync period before is stored in the storage unit 501, and the focal length lmn of each line can be calculated by referring to the storage unit 501 according to the central time tmn of the accumulation period calculated by the optical parameter calculation unit 105. The subsequent sequence until a correction value generation unit 106 generates correction values by referring to optical characteristics from an optical database 104 based on the calculated focal lengths, and an optical correction unit 107 executes correction is the same as that of the first embodiment.

In step S703, the optical parameter calculation unit 105 stores the drive information of the optical system 101 obtained from the system control unit 103 in the storage unit 501. Since the drive information of the optical system 101 one vertical sync period before is also required according to the central time tmn of the accumulation period of each line in step S702, the drive information is stored and held in advance in the storage unit 501, thus allowing the optical parameter calculation unit 105 to refer to that information.

In step S704, the optical parameter calculation unit 105 stores the drive information of the image sensor 102 obtained from the system control unit 103 in the storage unit 501. Since information of the reset operation of the image sensor 102 one vertical sync period before is required upon calculation of the central time tmn of the accumulation period of each line in step S701, that information is stored and held in the storage unit 501 in advance.

As described above, according to this embodiment, the drive information of the image sensor 102 and that of the optical system 101 are temporarily stored in the storage unit 501. Then, the optical parameter calculation unit 105 calculates the central time of the accumulation period of each line and an optical parameter at that central time by referring to the storage unit 501. In this way, the optical characteristics, which appear in an image captured by the line-sequential scanning type, can be precisely expressed, and optical correction with high precision can be attained consequently.

This embodiment comprises the storage unit 501, which stores and holds the drive information of the optical system 101 and that of the image sensor 102 one vertical sync period before. However, the present invention is not limited to this. For example, the system control unit 103 could control to always pass the current drive information of the optical system 101 and that of one vertical sync period before, and the same for the image sensor 102, thus obtaining the same effect.

Third Embodiment

The third embodiment of the present invention will be described below. In the first embodiment, the optical parameter calculation unit 105 refers to optical characteristics of respective lines from the optical database 104. By contrast, in the third embodiment, optical characteristics for a plurality of areas each including at least two lines as a unit are referred to.

Figure 8:
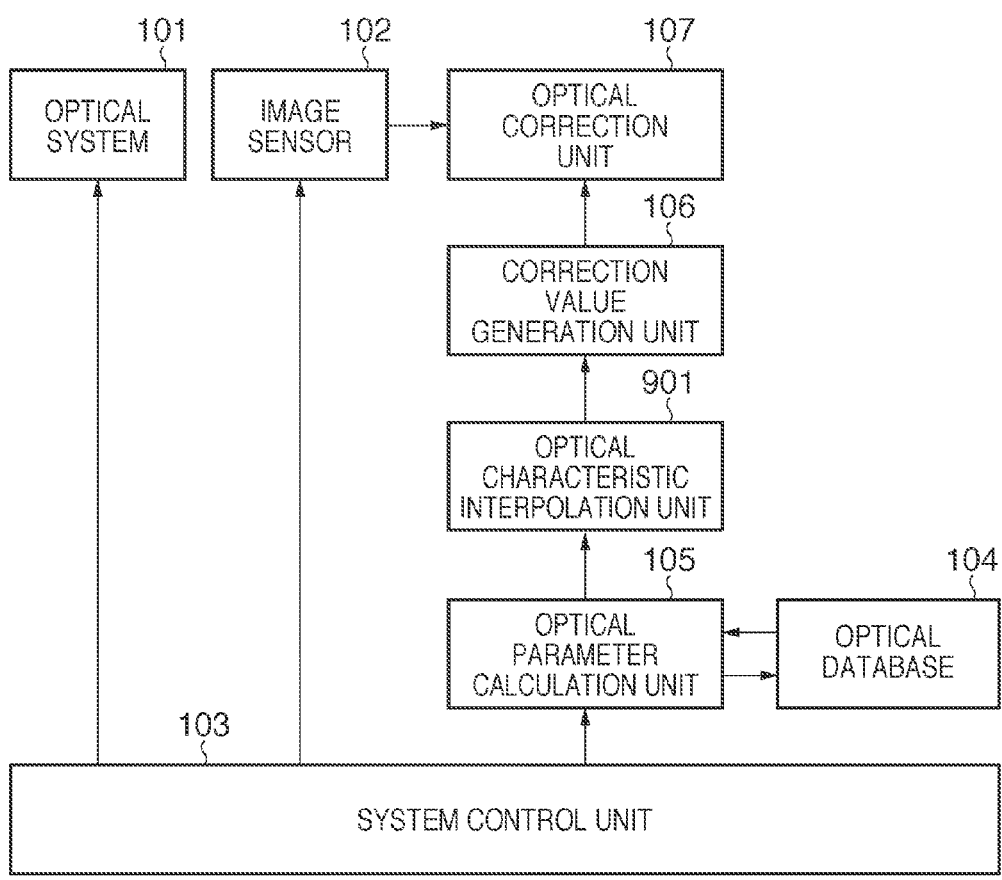
FIG. 8 is a block diagram showing the arrangement of an image capture apparatus according to the third embodiment of the present invention.

FIG. 8 is a block diagram showing the arrangement of an image capture apparatus according to the third embodiment. The same reference numerals denote components having the same functions as those of the first embodiment, and a description thereof will not be repeated. Reference numeral 901 denotes an optical characteristic interpolation unit which calculates optical characteristics of each line by interpolating those for a plurality of areas, which are output from an optical parameter calculation unit 105.

Figure 9:
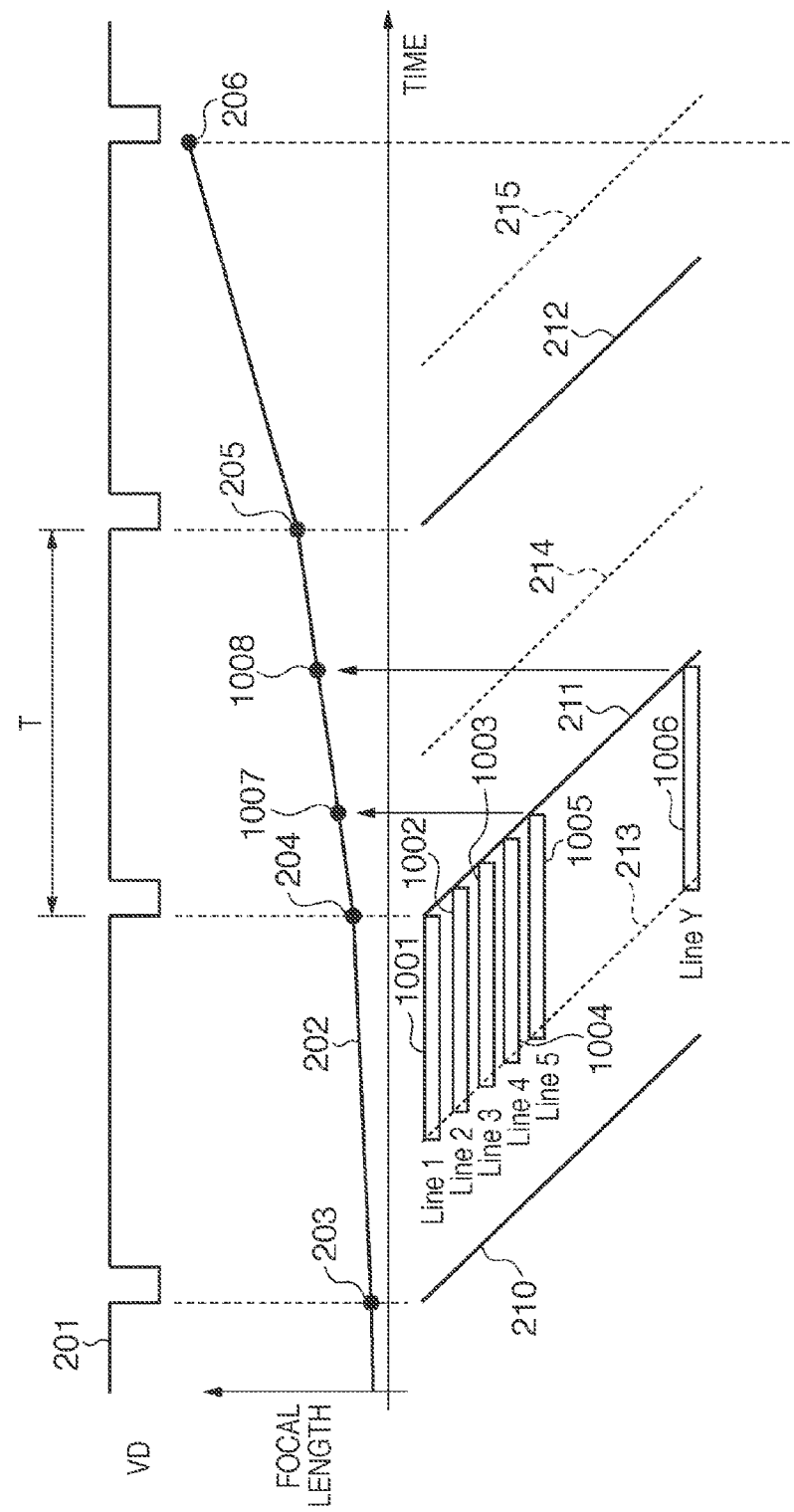
FIG. 9 is a timing chart which illustrates, along a time axis, the driving states of an image sensor and optical system according to the third embodiment.

FIG. 9 is a timing chart of the third embodiment. In FIG. 9, the same reference numerals denote portions corresponding to the first embodiment, and a description thereof will not be repeated. Lines 1001 to 1006 represent charge accumulation states of some lines in an image sensor 102, and the period from when charges are reset by a reset drive operation 213 until charges are read out by a read drive operation 211 corresponds to an accumulation period. Now assuming that five lines read out from the image sensor 102 are considered as one area, the optical parameter calculation unit 105 is controlled by a system control unit 103 to refer to an optical database 104 once per five lines.

Figure 10:
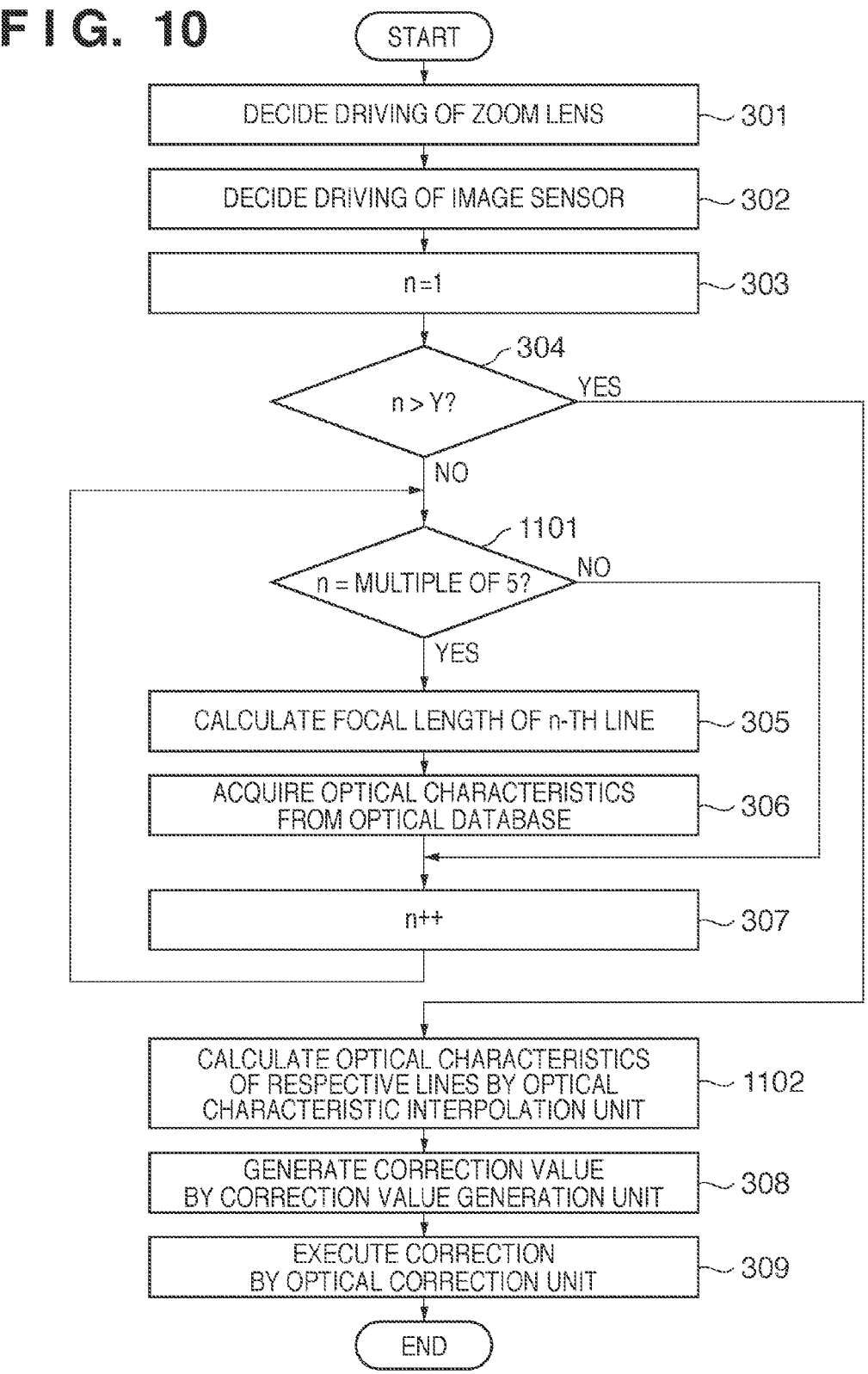
FIG. 10 is a flowchart showing an optical characteristic referring method according to the third embodiment.

FIG. 10 is a flowchart of this operation. The same step numbers denote steps that execute the same operations as in the first embodiment, and a description thereof will not be repeated. It is checked in step S1101 if the number n of lines is a multiple of "5". If n is a multiple of "5", the process advances to step S305, and the optical parameter calculation unit 105 calculates a focal length of the n-th line. If n is not a multiple of "5", the process jumps to step S307 to increment the number n of lines by "1". At this time, the system control unit 103 may control the optical parameter calculation unit 105 to refer to the optical database 104 every fifth line. Alternatively, the optical parameter calculation unit 105 may include a counter for counting the number of lines, and may be controlled to refer to the optical database 104 when the counter assumes a value corresponding to a multiple of "5", thus implementing the same control. In either case, the optical parameter calculation unit 105 acquires optical characteristics according to the focal length every fifth line, and passes them to the optical characteristic interpolation unit 901.

FIG. 9 shows a focal length 1007 at a read time of the fifth line, and a focal length 1008 at a read time of the Y-th line, so that the focal lengths are calculated intermittently to refer to the optical characteristics.

Figure 11:
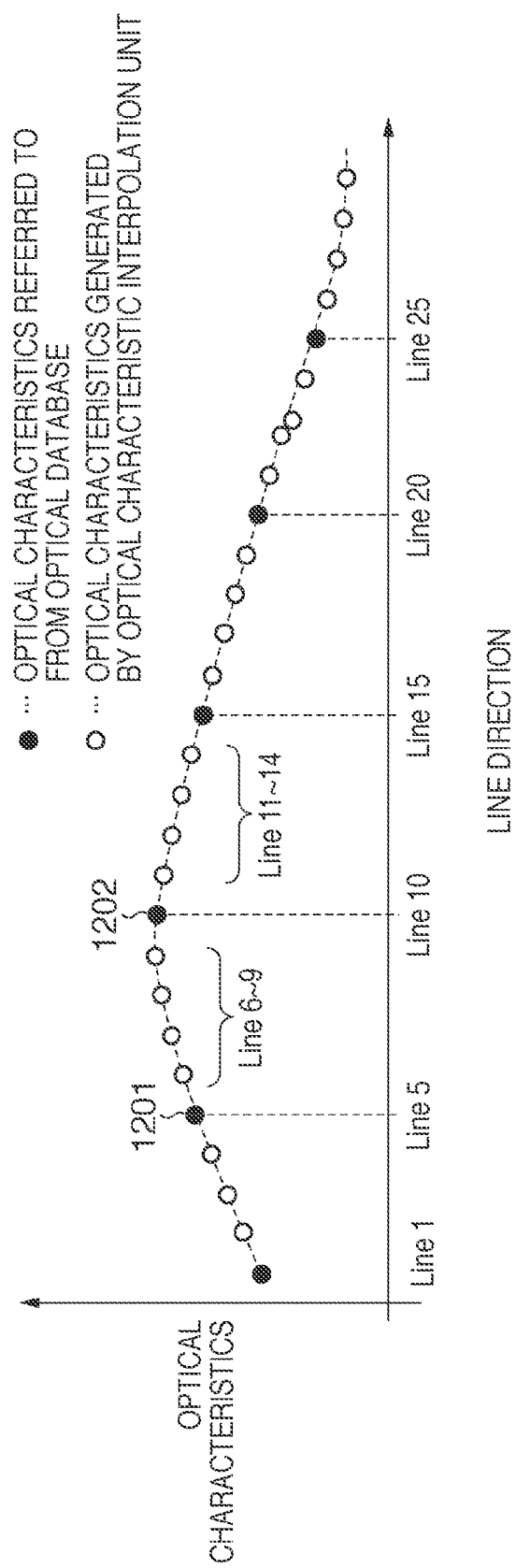
FIG. 11 is a view for explaining an interpolation generation method of optical characteristics for respective lines according to the third embodiment.

After completion of the calculations of the focal lengths for a plurality of areas each including five lines as a unit, and acquisition of the optical characteristics, the optical characteristic interpolation unit 901 calculates optical characteristics of respective lines which configure each area in step S1102. FIG. 11 shows states of optical characteristics referred to from the optical database 104. The abscissa plots a line direction, the ordinate plots optical characteristics, and black dots indicate optical characteristics referred to from the optical database 104. Since the optical characteristics referred to from the optical database 104 only exist every fifth lines, and those of middle lines are omitted, the optical characteristic interpolation unit 901 generates the optical characteristics of respective lines which configure each area by interpolating those which are referred to. For example, in the example of FIG. 11, the optical characteristics from the sixth line to the ninth line are calculated by linear interpolation from optical characteristics 1201 of the fifth line and optical characteristics 1202 of the 10th line. An interpolation method is not limited to this. In addition, for example, quadratic curve interpolation as a generally known method may be used to obtain the same effect.

As described above, the image sensor is divided into a plurality of areas each including two or more lines as one unit, and optical characteristics of the respective areas are referred to. Thus, the number of communication times to the optical database 104 and a communication data amount can be reduced, and the optical characteristic interpolation unit 901, which calculates omitted optical characteristics by interpolation, can calculate middle optical characteristics. For this reason, the optical characteristics, which appear in an image captured by the line-sequential scanning type, can be precisely expressed, and optical correction with high precision can be attained consequently.

In this embodiment, the optical characteristics of respective lines are calculated from intermittently obtained optical characteristics, and correction values are generated from the obtained optical characteristics of the respective lines. However, the same effect can be obtained when intermittent correction values are generated from the intermittent optical characteristics, and correction values of respective lines which configure each area are generated by interpolation calculations (correction value interpolation) from the obtained intermittent correction values. In either case, a communication data amount to the optical database 104 can be reduced, the optical characteristics, which appear in an image captured by the line-sequential scanning type, can be precisely expressed, and optical correction with high precision can be attained consequently.

Note that all the embodiments have exemplified the case in which the zoom lens is driven. However, the present invention is not limited to this. When a focus lens is moved in the same direction over a plurality of frames so as to adjust a focal point to an object, optical correction with high precision can be attained by the same method.

While the present invention has been described with reference to exemplary embodiments, it is to be understood that the invention is not limited to the disclosed exemplary embodiments.

This application claims the benefit of Japanese Patent Application No. 2010-110592, filed May 12, 2010, which is hereby incorporated by reference herein in its entirety.

What is claimed is:

1. An image capture apparatus comprising:

an optical system having at least a lens;

an image sensor of a line-sequential scanning type, which converts an object image formed by the optical system into an image signal, and sequentially outputs the image signal line by line;

an optical database configured to store optical characteristics of the optical system in advance;

a calculation unit configured to calculate a central time of an accumulation period for each area of said image sensor based on an accumulation start time and an accumulation end time of the each area of said image sensor, and to calculate optical parameters at the central time of the accumulation period;

a referring unit configured to refer to optical characteristics corresponding to the optical parameters calculated by said calculation unit of the optical characteristics stored in said optical database;

a correction value generation unit configured to generate correction values used to correct the image signal based on the optical characteristics referred to by said referring unit; and a correction unit configured to correct the image signal using the correction values generated by said correction value generation unit, wherein each area of said image sensor is configured by pixels of at least one line that configures said image sensor.

* * * * *